US007986306B2

(12) United States Patent
Eich et al.

(10) Patent No.: US 7,986,306 B2
(45) Date of Patent: Jul. 26, 2011

(54) RECONFIGURABLE USER INTERFACE (75) Inventors: Rodger W. Eich, Holland, MI (US);
James T. Hotary, Holland, MI (US);
David B. Busch, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 677 days.

(21) Appl. No.: 10/579,483

(22) PCT Filed: Nov. 18, 2004

(86) PCT No.: PCT/US2004/038780
§ 371 (c)(1),
(2), (4) Date: May 16, 2006

(87) PCT Pub. No.: WO2005/050428
PCT Pub. Date: Jun. 2, 2005

(65) Prior Publication Data
US 2007/0063980 A1    Mar. 22, 2007

Related U.S. Application Data (60) Provisional application No. 60/523,433, filed on Nov. 18, 2003.

(51) Int. Cl.
*G06F 3/041* (2006.01)
*G06F 3/042* (2006.01)
*G06F 3/033* (2006.01)
*G09G 5/00* (2006.01)
*G01C 21/00* (2006.01)
(52) U.S. Cl. ........ 345/173; 345/156; 345/176; 345/184; 701/200

(58) Field of Classification Search .................. 345/173, 345/156; 701/200
See application file for complete search history.

(56) References Cited

U.S. PATENT DOCUMENTS 5,508,703 A * 4/1996 Okamura et al. ............. 341/176
5,559,301 A * 9/1996 Bryan et al. ..................... 84/653
(Continued)

FOREIGN PATENT DOCUMENTS
WO    WO 03/088164    * 10/2003
(Continued)

OTHER PUBLICATIONS

International Search Report for Application No. PCT/US2004/038780, date of mailing Apr. 11, 2006, 4 pages.

*Primary Examiner* — Bipin Shalwala
*Assistant Examiner* — Benyam Ketema
(74) *Attorney, Agent, or Firm* — Foley & Lardner LLP (57) ABSTRACT A user interface for receiving inputs from a user includes a touch sensitive surface having a plurality of regions where each region corresponds to a switch having a function. The user interface also includes an interface disposed on the touch sensitive surface over at least one of the plurality of regions. The interface comprises a material that is at least partially transparent and that is configured to provide tactile feedback to the user. The touch sensitive surface may emit light that is visible through the interface. The interface may further include a plurality of buttons disposed over the plurality of regions wherein the light is selectively provided to each of the plurality of buttons. The touch sensitive surface may include a display that is configured to provide text and graphics that are visible through the interface. The user interface may be mounted in, for example, a vehicle.

24 Claims, 8 Drawing Sheets

U.S. PATENT DOCUMENTS

| | | | |
|---|---|---|---|
| 5,572,573 A * | 11/1996 | Sylvan et al. | 455/556.2 |
| 5,717,423 A * | 2/1998 | Parker | 345/108 |
| 5,841,428 A * | 11/1998 | Jaeger et al. | 345/184 |
| 6,282,464 B1 * | 8/2001 | Obradovich | 701/1 |
| 6,441,806 B1 * | 8/2002 | Jaeger | 345/172 |
| 6,636,197 B1 * | 10/2003 | Goldenberg et al. | 345/156 |
| 6,842,098 B2 * | 1/2005 | Van Zeeland | 335/205 |
| 2003/0128191 A1 * | 7/2003 | Strasser et al. | 345/173 |

FOREIGN PATENT DOCUMENTS

| | | |
|---|---|---|
| WO | WO 03/088164 A1 | 10/2003 |
| WO | WO 2005/043368 A2 | 5/2005 |

\* cited by examiner

RECONFIGURABLE USER INTERFACE

CROSS-REFERENCE TO RELATED APPLICATIONS

The present Application is a National Phase Application of PCT/US2004/038780 entitled, "Reconfigurable User Interface" filed on Nov. 18, 2004 which published under PCT Article 21(2) on Jun. 2, 2005 as WO2005/050428 A2 in the English language, which claims priority to U.S. Patent Application No. 60/523,433 filed Nov. 18, 2003, the entire disclosure of which, including the specification and drawings, is expressly incorporated herein by reference.

FIELD OF THE INVENTION

The present invention relates to user interfaces and displays and in particular to a user interface in a vehicle that is reconfigurable and provides visual and tactile feedback to a user.

BACKGROUND OF THE INVENTION

Touch screens or displays, e.g., plasma or LCD displays are commonly used to provide a user interface and to receive command and control inputs from a user. Touch screens include a transparent membrane that when depressed at certain locations activates a switch to execute a particular function. A touch screen may be coupled to, for example, electrical switches. Touch screens may be utilized as a user interface in numerous applications such as appliances, electronics equipment, for devices in a vehicle, etc. Typically, touch screens are flat (two dimensional) and require visual contact from a user while actuating a region on the touch screen coupled to a membrane switch or contact or a mechanical switch. This may be problematic for systems or devices in a vehicle as drivers would have to keep their eyes off of the road while selecting and actuating a switch using the touch screen. In addition, touch screens may acquire fingerprints and dirt from direct contact by users. A flat touch screen may also be difficult to see from different angles, for example, a passenger in a vehicle may have difficulty viewing and using a touch screen in the vehicle that is positioned for easier viewing by the driver of the vehicle.

It would be advantageous to provide a user interface for a touch screen or display that is configured to provide tactile feedback to a user so the user may identify when they are making contact with a particular region (e.g., a button) and actuate a switch associated with the region with minimal visual contact. In addition, it would be advantageous to provide an interface that includes buttons (or contact regions) that may be reconfigured by changing a display visible through the interface.

SUMMARY OF THE INVENTION

In accordance with one embodiment, a user interface for receiving inputs from a user includes a touch sensitive surface having a plurality of regions, each region corresponding to a switch having a function and an interface disposed on the touch sensitive surface over at least one of the plurality of regions, the interface comprising a material that is at least partially transparent and configured to provide tactile feedback to the user. The interface may comprise at least one button disposed over a region. The function corresponding to a button may be reconfigured by at least changing light emitted from the touch sensitive surface. The touch sensitive surface may emit light that is visible through the interface. The interface may further include a plurality of buttons disposed over the plurality of regions wherein the light is selectively provided to each of the plurality of buttons. The user interface may be mounted in, for example, a vehicle.

In accordance with another embodiment, a user interface for a vehicle includes a plurality of switches, each switch corresponding to a function, an interface disposed over at least one of the plurality of switches, the interface comprising a material that is at least partially transparent and configured to provide tactile feedback to a user, and a display disposed beneath the interface, the display configured to provide display signals corresponding to the function of each switch, the display being visible through the interface.

In accordance with another embodiment, a user interface system for a vehicle includes a display, an interface disposed over the display and comprising a material that is at least partially transparent and configured to provide tactile feedback to a user, the interface including a plurality of contact regions, where each contact region corresponds to a switch having a function, a control circuit coupled to the display and the interface, the control circuit configured to receive control data from the interface in response to actuation of a contact region, to provide the control data to a vehicle system based on the corresponding switch function and to provide display signals to the display based on the corresponding switch function, and a memory coupled to the control circuit and configured to store display data.

BRIEF DESCRIPTION OF THE DRAWINGS

The invention will be more readily understood by reference to the following description taken with the accompanying drawings, in which.

DETAILED DESCRIPTION OF THE PREFERRED AND OTHER EXEMPLARY EMBODIMENTS

Figure 1A:
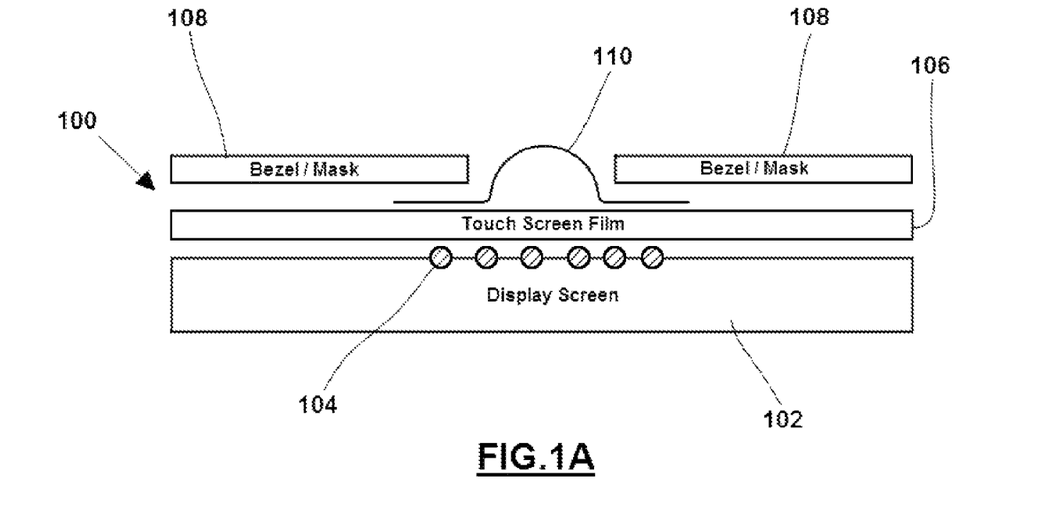
FIGS. 1A-1C are schematic block diagrams of a cross-section of a user interface and display in accordance with an embodiment.
Figure 1B:
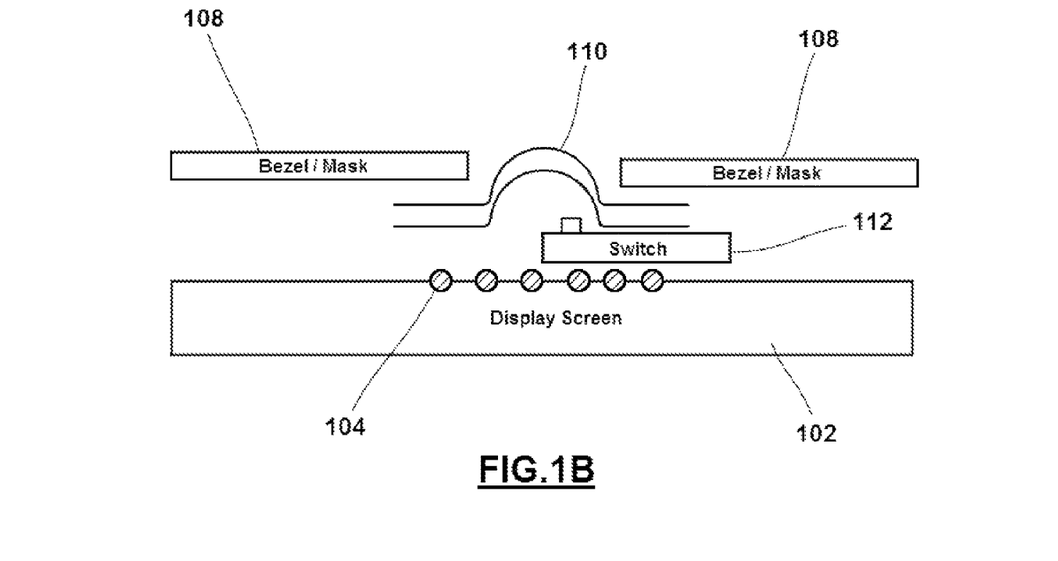
Figure 1C:
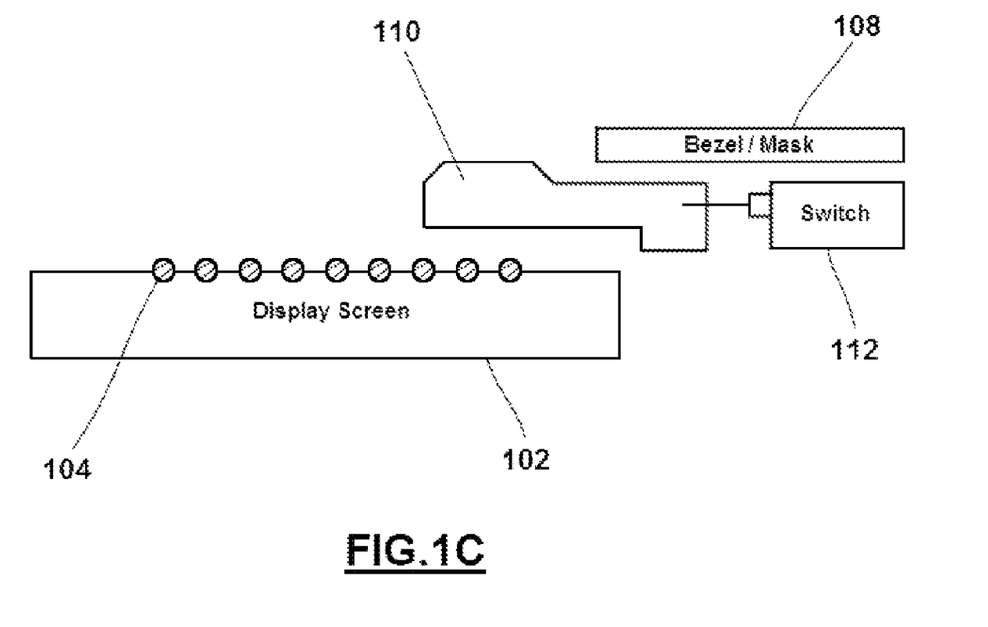

FIGS. 1A-1C are schematic block diagrams of a cross-section of an interface and display in accordance with an embodiment. In FIG. 1A, an interface 100 is disposed over a touch screen or display 102 such as a plasma touch screen, LCD touch screen, etc. The touch screen or display may be any known touch sensitive screen or display (e.g., a capacitive touch screen, a resistive touch screen, etc.) that includes at least one membrane switch or contact covered by a membrane 106 capable of sensing pressure. Membrane 106 and button/pad 110 are at least partially light permeable, e.g., transparent, translucent, etc. A membrane switch may be actuated by applying pressure, e.g., by a user's finger, to a button or pad 110 disposed over the membrane switch of touch screen film 106. In an alternative embodiment shown in FIG. 1B, a switch 112 (e.g., a mechanical or electrical switch) may be located beneath a transparent button or membrane 110 such that when pressure is applied, the switch is activated. In another embodiment, shown in FIG. 1C, a switch 112 (e.g., a mechanical or electrical switch) may be located to the side of display 102 (e.g., a LCD display). A transparent button 110 is disposed over the display screen 102 and is coupled to switch 112. When pressure is applied to button 110, switch 112 is activated.

Returning to FIG. 1A, interface 100 includes a bezel or mask 108 (e.g., a plastic bezel) that includes an aperture that may be disposed over a membrane switch of touch screen film 106 for display 102. A button or pad 110 is disposed within the aperture and may be coupled to bezel or mask 108. Button 110 may be fabricated from a flexible material that is at least partially semi-transparent or transparent (or semi-translucent, translucent, opaque, light permeable) such as silicon, polycarbonate, other plastics, etc. In addition, the material used for button(s) 110 may be washable. Interface 100 may be configured to include a plurality of buttons or pads 110 that are disposed over at least one membrane switch of touch screen 106. Accordingly, interface 100 may have a mask 108 that includes multiple apertures for multiple buttons or pads 110. Interface 100 advantageously provides multiple buttons or pads corresponding to various switch types, as described further below. Interface 100 may protect the underlying touch screen film 106 and/or display 102.

Light from the touch screen or display 102, e.g. a color, text or graphics 104, may advantageously be viewed through the button or pad 110 of the interface 100. When button 110 is depressed or pressure applied, the button makes localized contact with the touch screen film 106 to actuate the membrane switch to activate an assigned function of the membrane switch. In the embodiments shown in FIGS. 1B and 1C, when button 110 is depressed or pressure is applied, the switch 112 is actuated to activate an assigned function of switch 112. Button 110 is transparent so that light 104 from display 102 is visible through button 110.

Figure 2:
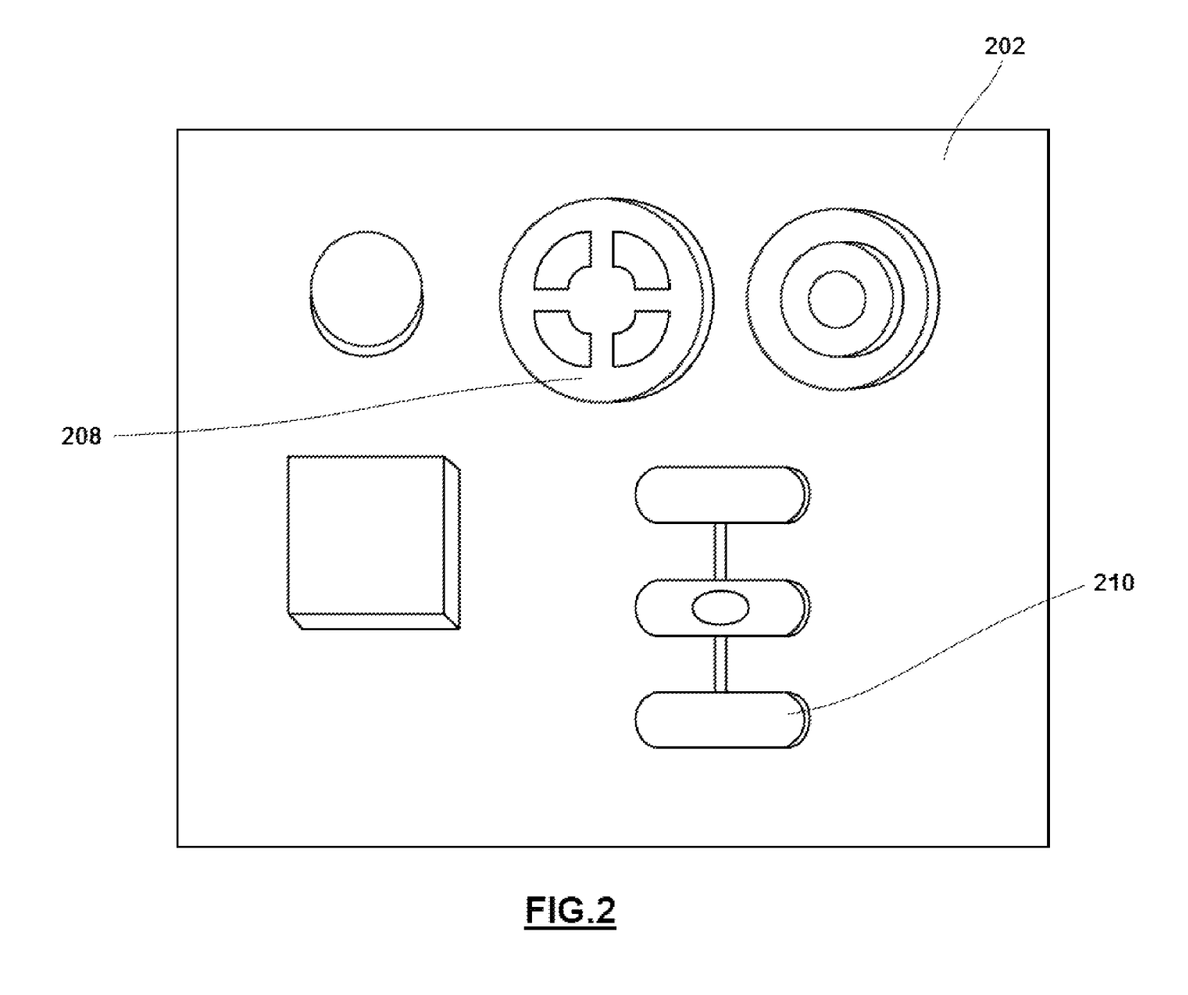
FIG. 2 is a schematic diagram of an exemplary interface in accordance with an embodiment.
Figure 3:
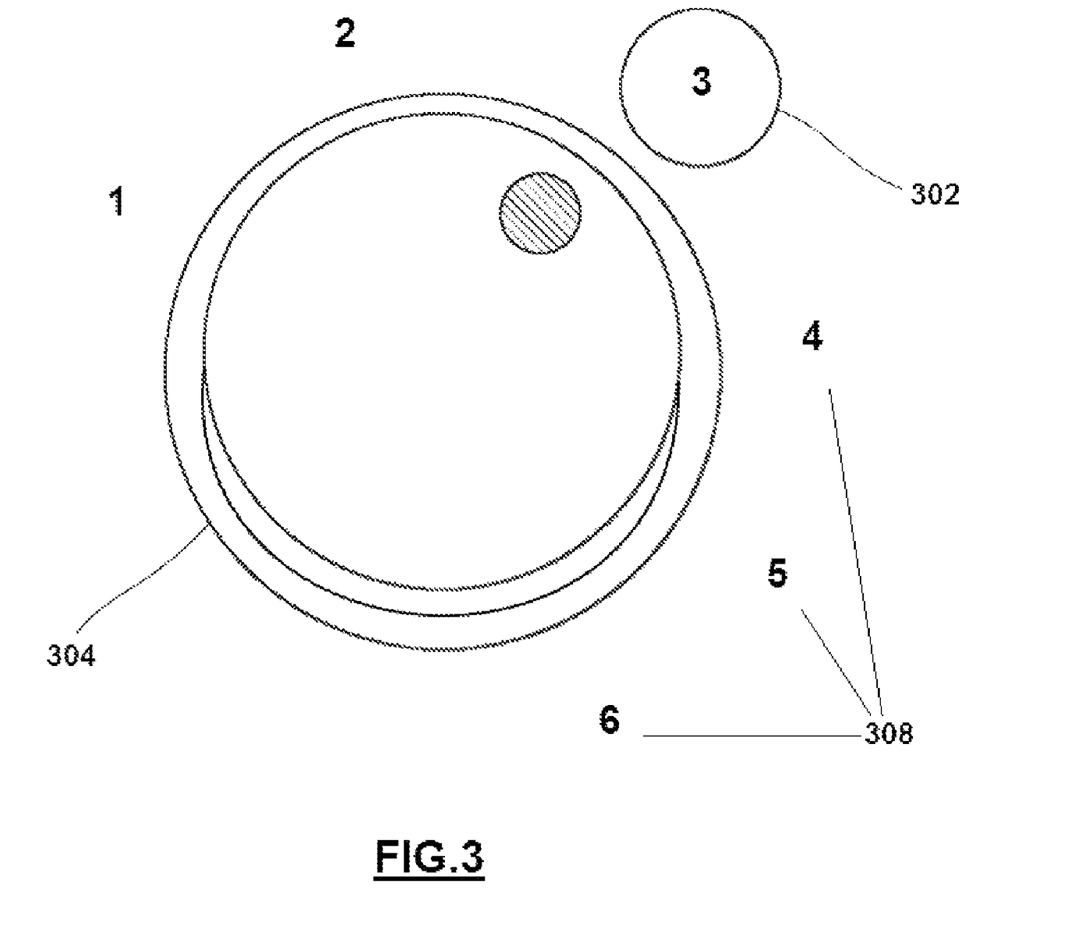
FIG. 3 is a perspective view of an exemplary rotary type switch that may be emulated on an interface in accordance with an embodiment.

Buttons or pads 110 of interface 100 may take various different forms or shapes to emulate different types of switches or control/input devices such as a joystick, a rocker switch, a rotary switch, a toggle switch, a four-point rocker switch, a D-pad, multi-access switch, a jog dial, a slider switch, etc. as shown in FIGS. 2 and 3. In FIG. 2, an interface 202 is shown. As mentioned, interface 102 may be disposed over a touch screen or display (not shown). Interface 202 includes various forms of buttons or pads such as a slider switch 210 or a four-point rocker 208. The buttons or pads of interface 202 are advantageously three-dimensional and, therefore, provide tactile feedback to a user. Accordingly, a user may identify when they are making contact with a particular button. For example, slide switch 210 may be formed by creating a depression or trough in a button or pad that has defined endpoints. A user may slide a finger across the tough and have tactile feedback when the endpoints have been reached. A button or pad in the form of a slide switch 210 may be used, for example, to control a volume function of an audio system in a vehicle. The three-dimensional, tactile feature of the buttons/pads on interface 202 may allow a user, such as a driver of the vehicle, to actuate the switch with minimal visual contact. Interface 202 may be further configured to include other tactile feedback such as a vibration or to provide audible feedback such as a beep or click sound. In addition, the three-dimensional buttons or pads may be more easily visible to users at various locations as a result of the light visible (or piped) through the buttons/pads of the interface from a display disposed beneath the interface.

FIG. 3 shows an exemplary rotary type switch that may be emulated on the interface 100 in accordance with an embodiment. A rotary type button/pad 304 may be used to control functions such as volume, etc. By twisting the button 304, buckle points are created that push left or right and make contact with the membrane switch of the touch screen. In other words, the side of the button 304 will collapse (buckle points) as a rotary load is applied and activate the switch. While there is contact between the button and the membrane switch, the display of the touch screen may change the text or graphics highlighted or shown. In FIG. 3, a graphic 302 showing the number three is highlighted. In another embodiment, a reference point may also be viewed on the rotary type button 304. In the exemplary embodiment of FIG. 3, as a user continues to apply a rotary load to the button in a clockwise direction, the successive numbers, 4, 5, 6, etc. may be highlighted. The user may stop twisting the button to select the desired item. As mentioned above, other tactile feedback, such as a vibration, or audible feedback, such as a beep sound, may be provided for rotary switch 304.

Figure 5:
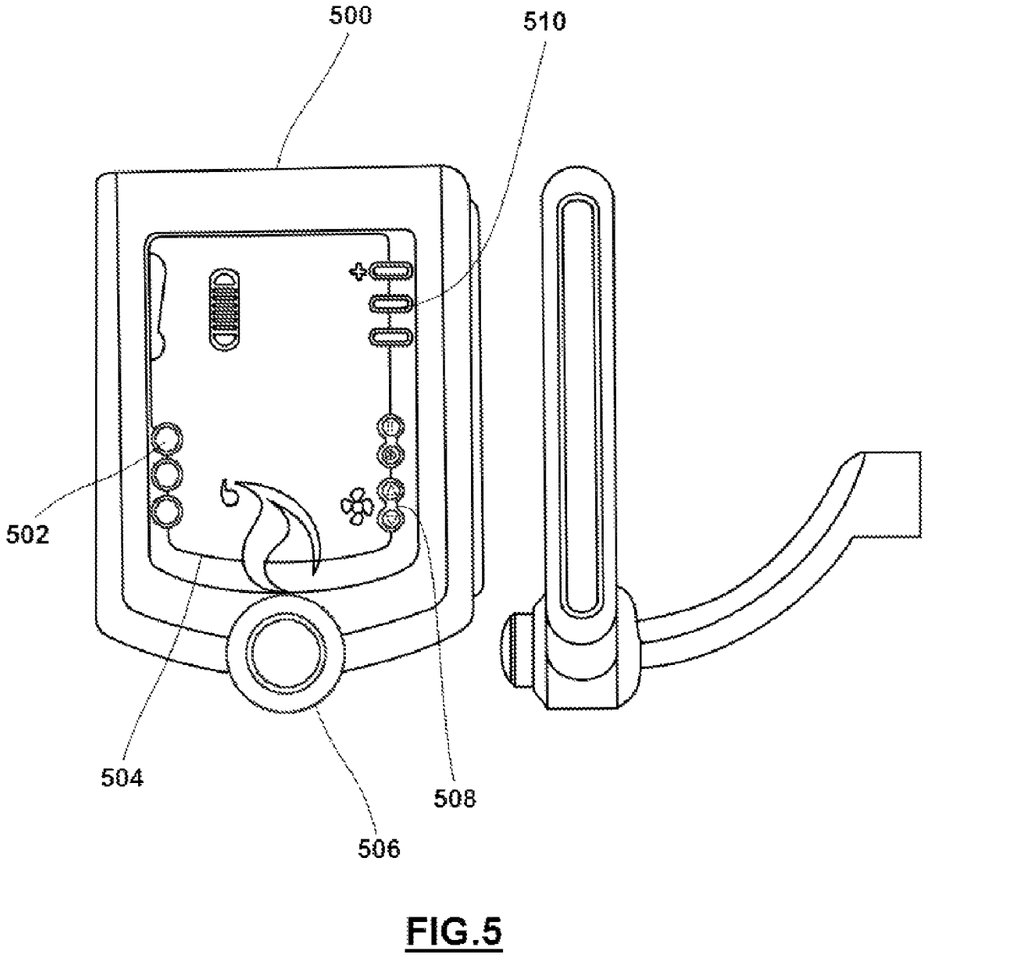
FIG. 5 shows an exemplary menu display for a user interface in accordance with an embodiment.

Returning to FIGS. 1A-1C, as mentioned above, the touch screen or display 102 provides light 104 in the form of colors, graphics, text, etc. that is visible through the buttons 110 of interface 100. For example, display 102 may provide a menu (e.g., text, graphics or both) for various functions. An exemplary menu display is shown in FIG. 5. Display menu 500 shown in FIG. 5 includes graphics and text representing a particular function that may be controlled using a button (i.e., of an interface disposed over the display) and switch (e.g., a membrane switch) corresponding to the graphic or text. For example, menu 500 in FIG. 5 illustrates various vehicle functions such as audio 504, temperature 502 or 506, fan level 508, etc. When a particular function is selected (i.e., by depressing a button on of an interface as described above), a different menu (i.e., part of a hierarchical menu tree associated with a particular function or system) may be displayed and the function corresponding to a particular switch and button may change. For example, a further menu or display related to navigation functions may be shown by selecting the button and membrane switch 510 labeled "nav" on display 500. In this manner, the touch screen or display may be used to show multiple different menu's or displays and thereby the function of the buttons of interface 100 (shown in FIG. 1A) may be changed based on the screen or menu display. Accordingly, the buttons/switches of an interface may be reconfigured and changes in the functions may be conveyed to a user by the text, graphics, light, etc. from display 102 (shown in FIG. 1A) viewed through the interface 100. In another example, buttons that correspond to a switch that has an assigned function may be lit while buttons that correspond to switches that have not been assigned a function (e.g., based on the current menu being displayed) may not be lit. As mentioned, the light used to illuminate different buttons or pads may be different colors.

Figure 4:
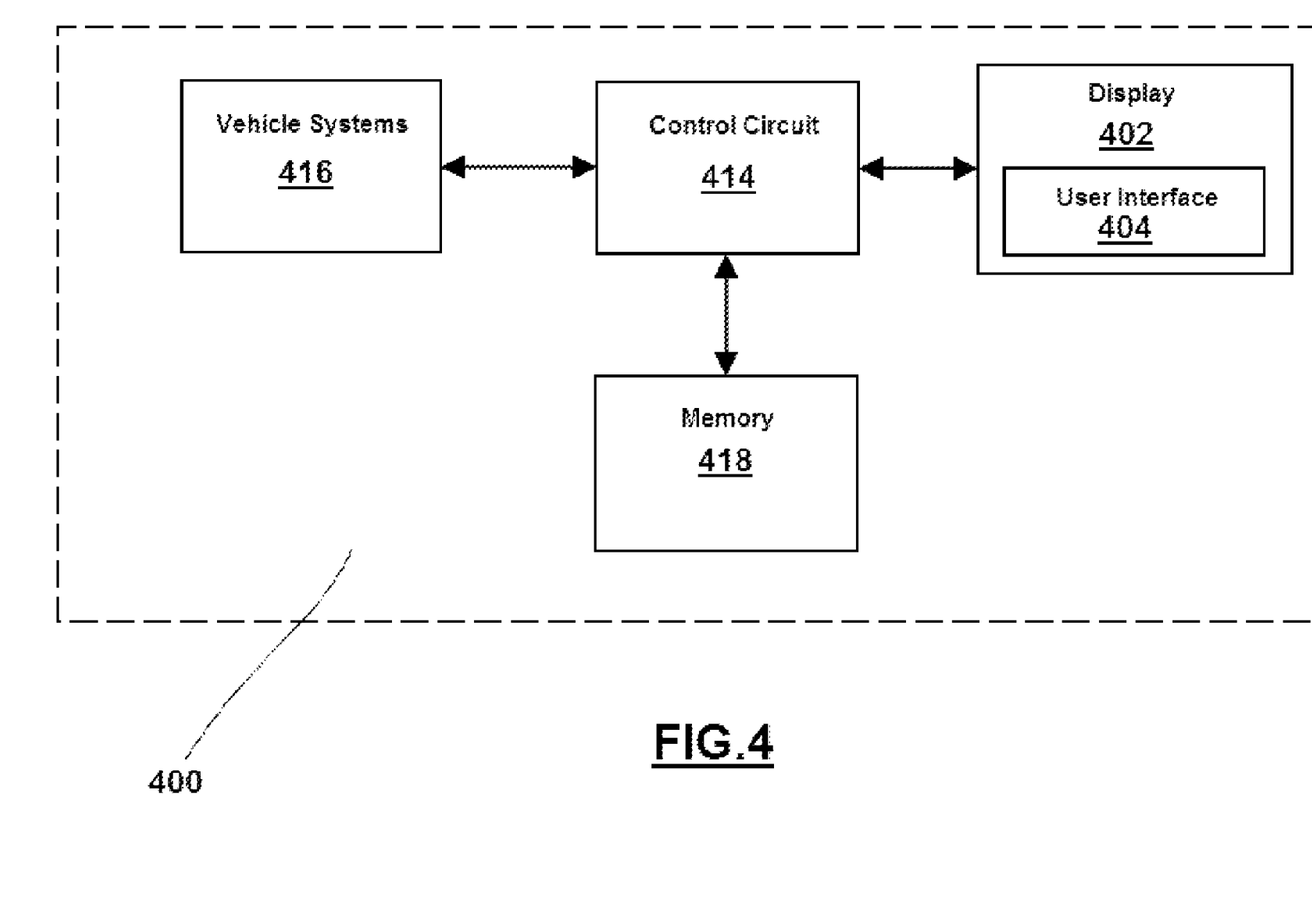
FIG. 4 is a schematic block diagram of a reconfigurable user interface system in a vehicle in accordance with an embodiment.

Referring to FIG. 1A, the menus/displays provided (e.g., the text, graphics or light patterns) on display 102 as well as the functions corresponding to the items on the menu/display may be controlled by, for example, software provided in a control module coupled to the touch screen or display 102. FIG. 4 is a schematic block diagram of a reconfigurable user interface system in a vehicle in accordance with an embodiment. A display 402 (e.g., an LCD display, a plasma touch screen display, etc.) is coupled to a control circuit 414. Display 402 includes a user interface 404 and may be mounted in, for example, an overhead console, although it may be mounted at any conveniently accessible location within easy reach of the vehicle operator, such as in an instrument panel, dashboard, visor, rearview mirror or other appropriate location in the vehicle. Control circuit 414 may comprise one or more analog and/or digital electrical or electronic components, and may include a microprocessor, microcontroller, application-specific integrated circuit (ASIC), programmable logic, and/or other analog and/or digital circuit elements configured to perform the various functions to be described herein. Control circuit is coupled to a memory 418, including volatile and non-volatile memory to, for example, store a computer program or other software to perform the functions described herein. In addition, control circuit 414 is coupled to various vehicle systems 416 such as a navigation system, an audio system, an HVAC system, a hands-free telephone system, etc. Each element in vehicle 400 shown in FIG. 1 may be mounted in the same or different interior vehicle elements such as a dashboard, an overhead console, an instrument panel, a visor, a rearview mirror, or other appropriate location in the vehicle.

Memory 418 is configured to store display and menu information for various vehicle functions (e.g., navigation functions, volume and other audio system functions, etc.). Control circuit 414 is configured to retrieve display data (e.g., a menu, a portion of a hierarchical menu tree or a particular function) from memory 418 and provide the display data to display 402. User input received via display 402 and user interface 404 is provided to control circuit 414 which is configured to provide the control data to an appropriate vehicle system 416, such as a navigation system, an audio system, a hands-free telephone system, etc. For example, if a button corresponding to a volume function of an audio system is actuated to lower the volume, control circuit 414 receives the control data and provides the data to the audio system such that the volume may be controlled. In addition, control circuit 414 may provide display signals to display 402 such that the display visible through user interface 404 may indicate the change in volume to a vehicle occupant. Control circuit 414 is also configured to provide other feedback control signals for a particular button of user interface 404, such as to provide tactile feedback (e.g., a vibration), audible feedback (e.g., a click sound), etc. related to the particular type and function of the button.

Figure 6:
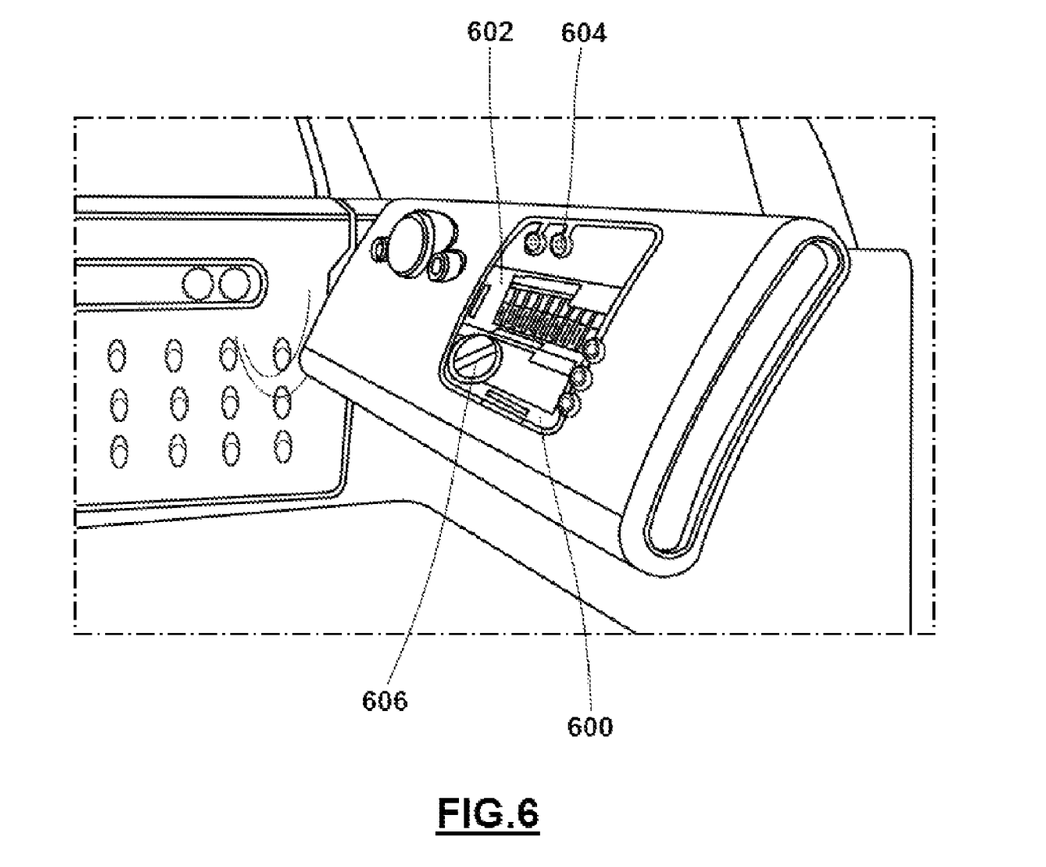
FIG. 6 shows an exemplary display and user interface for a vehicle in accordance with an embodiment.
Figure 7:
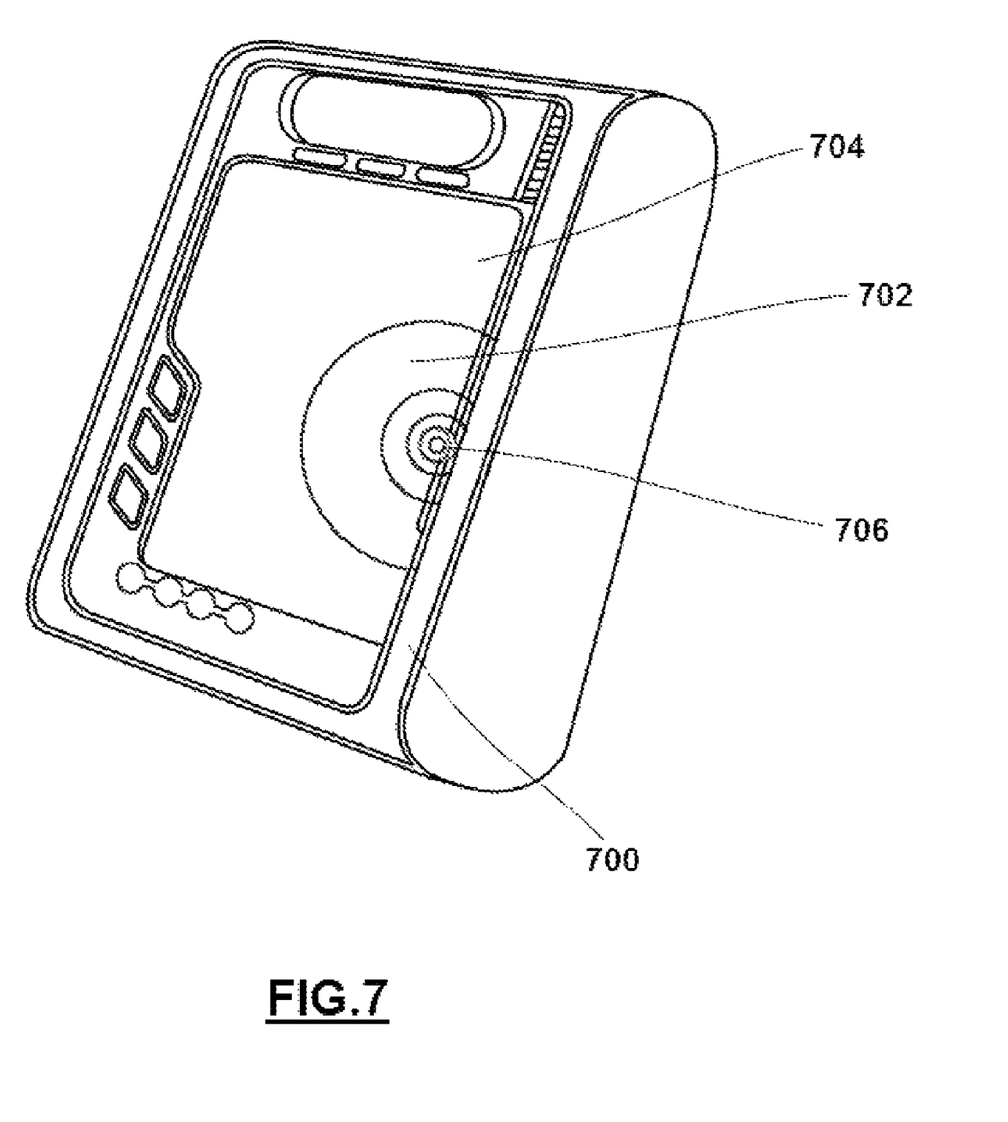
FIG. 7 shows an exemplary display and user interface for a vehicle in accordance with an embodiment.

FIG. 6 shows an exemplary display and user interface for a vehicle in accordance with an embodiment. In FIG. 6, an instrument panel 600 having a touch screen is shown. An interface 602 as described herein is disposed over a touch screen display and provides buttons/pads such as button 604 and rotary switch 602. FIG. 7 shows an exemplary display and user interface in accordance with an embodiment. In FIG. 7, an exemplary touch screen display 700 for a hands-free telephone system is shown. An interface 702 is disposed over the touch screen and provide buttons/pads 704, 706 that may be used to select and/or control various functions of the hands-free telephone system such as answering a call 706.

It is important to note that the construction and arrangement of the display and reconfigurable user interface as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Accordingly, all such modifications are intended to be included within the scope of the present invention as described herein. The order or sequence of any processes or method steps may be varied or re-sequenced according to alternative embodiments. Other substitutions, modifications, changes and/or omissions may be made in the design, operating conditions and arrangement of the preferred arid other exemplary embodiments without departing from the exemplary embodiments of the present invention as expressed herein.

What is claimed is:

1. A user interface for receiving inputs from a user, the user interface comprising:
    a touch sensitive surface having a plurality of regions, each region corresponding to a selectable function;
    an interface formed from a continuous flexible sheet of at least partially transparent material and disposed on the touch sensitive surface over the plurality of regions, the interface configured to provide tactile feedback to the user by flexibly deforming when pressed by the user, wherein the touch sensitive surface is at least partially transparent and wherein at least one of a system of lights and an electronic display are disposed under the touch sensitive surface and controlled by electronics configured to selectively provide light to each of the regions; and
    a rotary switch formed from the flexible sheet of the interface and configured for twisting relative to the at least one of a system of lights and the electronic display, wherein the rotary switch is configured to be twisted and to create one or more buckle points in the flexible sheet of the interface when twisted, the buckle points detectable by the touch sensitive surface.

2. A user interface according to claim 1, wherein a portion of the interface is flexed upward and away from the touch sensitive surface over each region to simulate a mechanical button over each region.

3. A user interface according to claim 2, wherein the function corresponding to one or more of the plurality of regions is configured to be changed by changing the light provided to each of the regions.

4. A user interface according to claim 1,
    wherein the interface is configured to make localized contact with the region of the touch sensitive surface when pressed by the user.

5. A user interface according to claim 1, wherein the user interface is mounted in a vehicle.

6. A user interface according to claim 1, wherein the touch sensitive surface includes a display for at least one of graphics and text, and the at least one of graphics and text are visible through the interface.

7. A user interface according to claim 1, wherein the touch sensitive surface and interface are mounted in an automobile interior element.

8. A user interface according to claim 6, wherein the display is mounted in an automobile interior element.

9. A user interface for a vehicle, the user interface comprising:
    a plurality of switches, each switch corresponding to a function;
    an interface formed from a continuous flexible sheet of at least partially transparent material and disposed over and spaced away from the plurality of switches, the interface configured to provide tactile feedback to a user by flexibly deforming toward the plurality of switches when pressed;
    a display disposed beneath the interface, the display configured to provide display signals corresponding to the function of each switch, wherein the interface is flexed away from the plurality of switches over each switch to simulate a plurality of buttons disposed over the plurality of switches and wherein the display is configured to selectively provide light beneath each of the plurality of simulated buttons; and a rotary switch formed from the flexible sheet of the interface and configured for twisting relative to the display, wherein the rotary switch is configured to be twisted and to create one or more buckle points in the flexible sheet when twisted, the buckle points detectable by the plurality of switches.

10. A user interface according to claim 9, wherein the display signals include light that is visible through the interface.

11. A user interface according to claim 9, wherein the display signals include text that is visible through the interface.

12. A user interface according to claim 9, wherein the display signals include graphics that are visible through the interface.

13. A user interface according to claim 9, wherein the plurality of switches, interface and display are mounted in a automobile interior element.

14. A user interface system for a vehicle, the system comprising:

a display;

an interface disposed over the display and comprising a continuous sheet of flexible material that is at least partially transparent and configured to provide tactile feedback to a user, the interface including a plurality of contact regions, each contact region corresponding to a switch having a function;

a control circuit coupled to the display and the interface, the control circuit configured to receive control data from the interface in response to actuation of a contact region, to provide the control data to a vehicle system based on the corresponding switch function and to provide display signals to the display based on the corresponding switch function; and a memory coupled to the control circuit and configured to store display data; and a rotary switch formed from the material of the interface and configured for twisting relative to the display, wherein the rotary switch is configured to be twisted and to create one or more buckle points in the material when twisted, the buckle points detectable by the plurality of contact regions.

15. A user interface system according to claim 14, wherein the display is a touch sensitive surface having a plurality of regions, each region corresponding to a switch having a function.

16. A user interface system according to claim 14, wherein the display, the interface, the control circuit and the memory are mounted in an automobile interior element.

17. A user interface system according to claim 14, wherein a function corresponding to a contact region may be reconfigured by at least changing the display signals provided to an area of the display disposed beneath the contact region.

18. A user interface according to claim 1, wherein a portion of the interface is formed as a rotary control configured to twist with respect to the touch sensitive surface.

19. A user interface according to claim 1, wherein the a portion of the interface is configured to move in a direction not perpendicular to the touch sensitive surface; and wherein moving of the portion of the interface in a direction not perpendicular to the touch sensitive surface is sensed by a control circuit which causes light to be selectively provided to one or more of the plurality of regions on the touch sensitive surface, each region corresponding to a different function.

20. A user interface according to claim 1, wherein at least one of the interface and the touch sensitive surface is coupled to a control circuit configured to provide feedback to user actuation of the interface via audible feedback.

21. A user interface according to claim 1, wherein at least one of the interface and the touch sensitive surface is coupled to a control circuit configured to provide feedback to user actuation of the interface via vibratory feedback.

22. A user interface according to claim 9, wherein the rotary switch is configured to be twisted in a direction not perpendicular to the face of the display.

23. A user interface according to claim 9, wherein at least one of the interface and the plurality of switches is coupled to a control circuit configured to provide feedback to user actuation of the interface via audible feedback.

24. A user interface according to claim 9, wherein at least one of the interface and the plurality of switches is coupled to a control circuit configured to provide feedback to user actuation of the interface via vibratory feedback.

* * * * *